United States Patent [19]

Tuley et al.

[11] 4,214,851
[45] Jul. 29, 1980

[54] STRUCTURAL COOLING AIR MANIFOLD FOR A GAS TURBINE ENGINE

[75] Inventors: Eugene N. Tuley, Hamilton; Delmer H. Landis, Jr., Loveland; Paul W. Lozier, North Bend, all of Ohio

[73] Assignee: General Electric Company, Cincinnati, Ohio

[21] Appl. No.: 898,060

[22] Filed: Apr. 20, 1978

[51] Int. Cl.² ............................ F01D 5/18; F01D 9/04
[52] U.S. Cl. ...................................... 415/115; 415/159
[58] Field of Search ............... 415/115, 116, 159, 160, 415/175, 180

[56] References Cited

U.S. PATENT DOCUMENTS

| | | | |
|---|---|---|---|
| 2,862,654 | 12/1958 | Gardiner | 415/160 |
| 2,896,906 | 7/1959 | Durkin | 415/115 |
| 3,123,283 | 3/1964 | Leis | 415/115 |
| 3,558,237 | 1/1971 | Wall | 415/115 |
| 3,800,864 | 4/1974 | Hauser et al. | 415/115 |
| 3,850,544 | 11/1974 | Ciokajlo | 415/175 |
| 3,966,354 | 6/1976 | Patterson | 415/116 |
| 3,975,901 | 8/1976 | Hallinger et al. | 415/115 |

FOREIGN PATENT DOCUMENTS

| | | | |
|---|---|---|---|
| 676314 | 7/1952 | United Kingdom | 415/115 |
| 976124 | 11/1964 | United Kingdom | 415/115 |
| 1119774 | 7/1968 | United Kingdom | 415/116 |

*Primary Examiner*—Everette A. Powell, Jr.
*Assistant Examiner*—A. N. Trausch, III
*Attorney, Agent, or Firm*—Robert C. Lampe, Jr.; Donald W. Walk; Derek P. Lawrence

[57] ABSTRACT

An integrally cast structural cooling air manifold for a gas turbine engine being of generally annular shape and having two concentric thin walls defining a plenum therebetween. Each of the walls is provided with embossments through which aligned radial holes are bored to furnish support for a stage of rotatable vane trunnions. A series of circumferentially spaced inlet ports on the outer wall distribute cooling air into the plenum, from which it is routed to the vane airfoil portions to perform cooling functions by means of passages which commumnicate with the plenum via openings in the vane trunnions. Thus, the manifold performs the dual functions of distributing coolant to the vanes and supporting the vane trunnions in the manner of a turbine frame.

11 Claims, 5 Drawing Figures

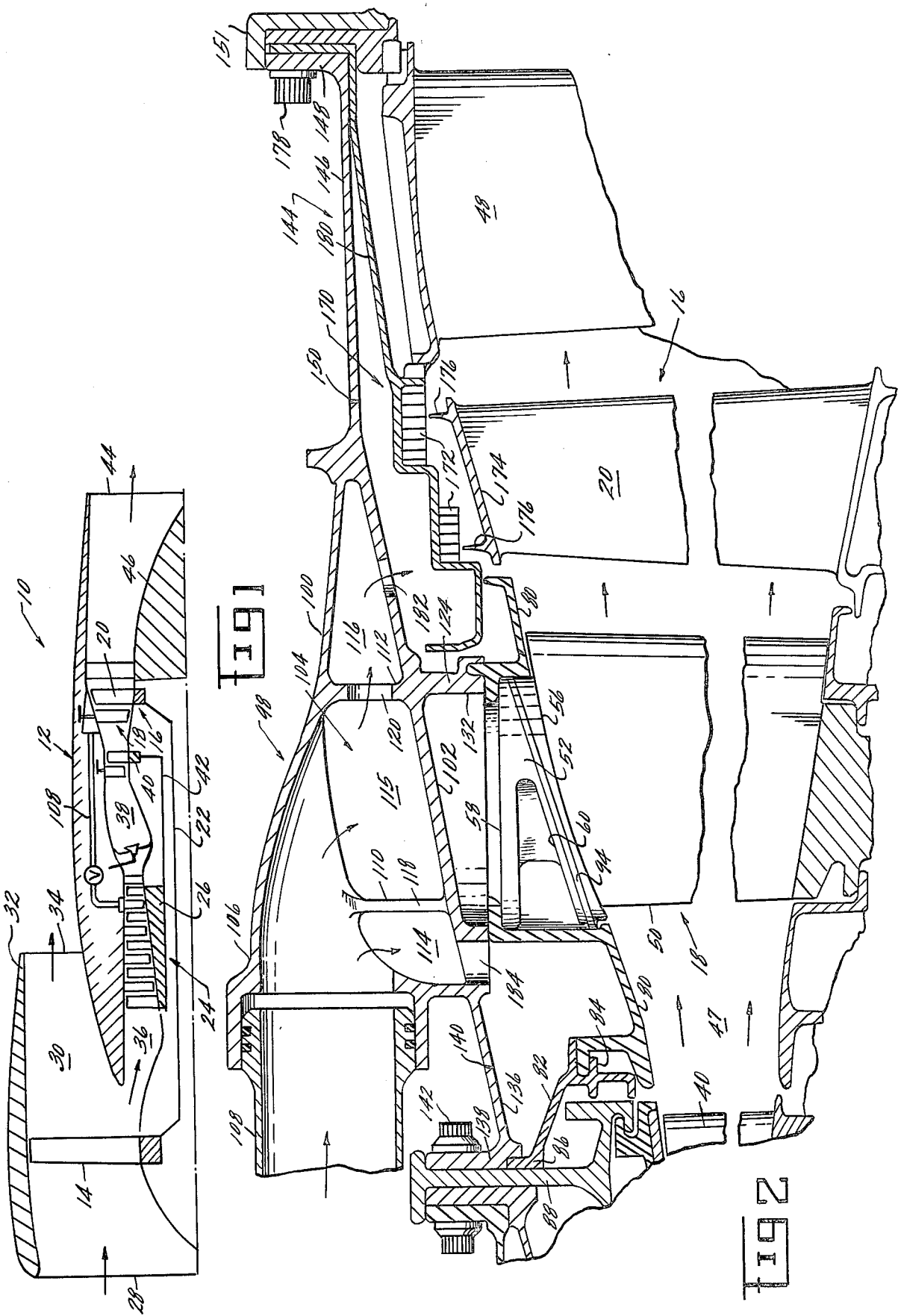

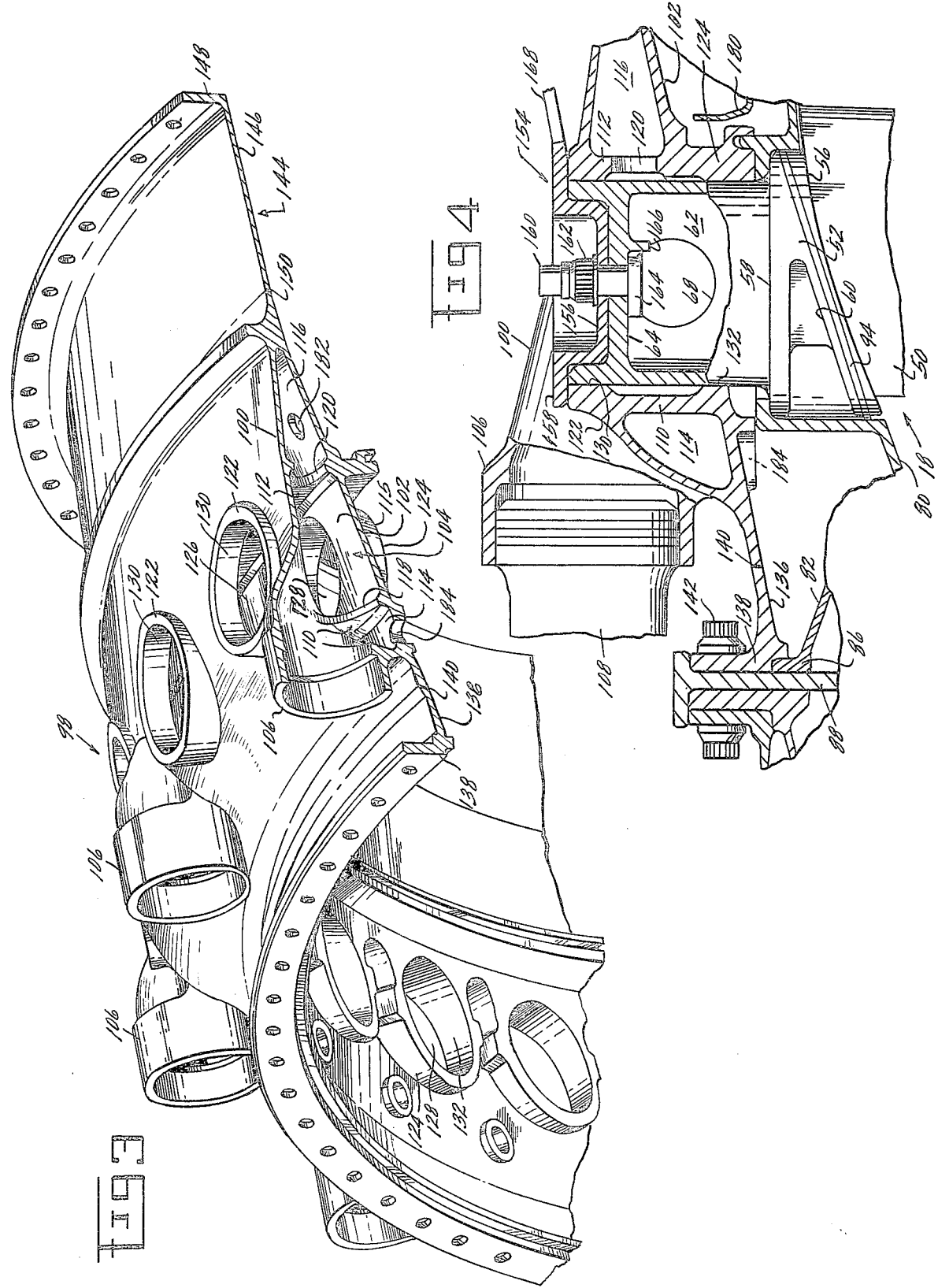

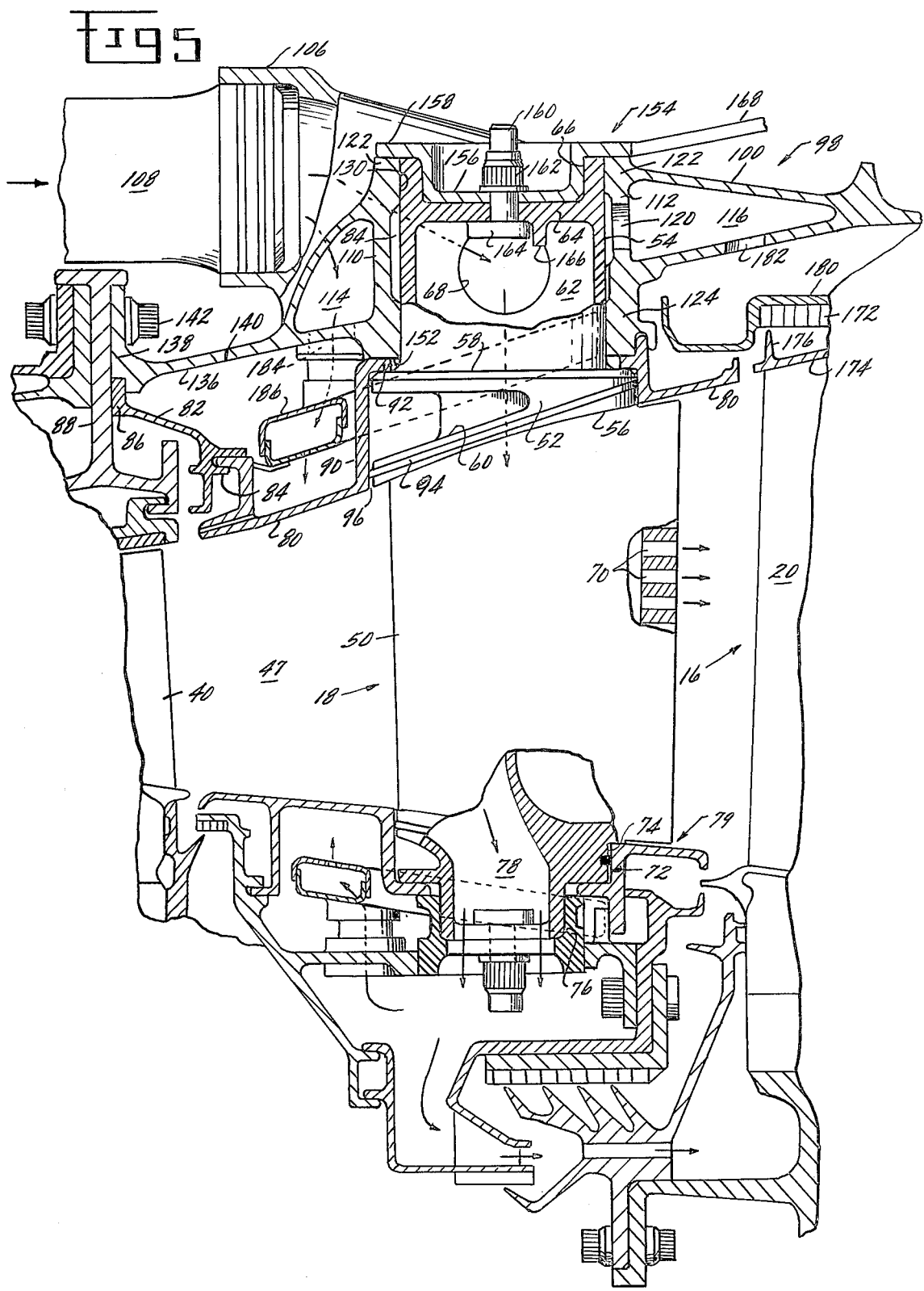

STRUCTURAL COOLING AIR MANIFOLD FOR A GAS TURBINE ENGINE

BACKGROUND OF THE INVENTION

This invention relates generally to aircraft gas turbine engines and, more particularly, to a structural cooling air manifold associated with a high temperature, variable area, low pressure turbine.

It is by now understood that in gas turbine engines energy is added to the air through the processes of compression and combustion, while energy is extracted by means of a turbine. In a turbofan engine, compression is accomplished sequentially through a fan and thereafter through a multistage compressor, the fan and compressor being independently driven by a high pressure and a low pressure turbine, respectively, through concentric shaft connections. Combustion occurs between the multistage compressor and the high pressure turbine. Since the energy available to the turbines far exceeds that required to maintain the compression process, the excess energy is exahausted as high velocity gases through one or more nozzles at the rear of the engine to produce thrust by the reaction principle.

Since the fan and compressor are on separate concentric shafts and are driven by separate, axially spaced turbines, a means for regulating their relative rotational speeds is desirable for performance optimization. Further, it becomes desirable to control the relative amounts of energy added by the fan and compressor which, in turn, are controlled by how much energy is extracted by their respective turbines. It can be appreciated that the faster the fan or compressor rotates, the more air it pumps, and vice versa. Furthermore, it is recognized that if a stage of stationary turbine vanes may be made to provide a variable flow area through the turbine by making the vanes rotatable about their respective longitudinal axes, the energy extraction characteristics of either of the high or low pressure turbines may be modulated. Thus, if the capability of the high pressure turbine to extract energy was reduced, more energy would be available to the low pressure turbine and the fan could be driven at a higher rotational speed relative to the compressor, and vice versa. This ability to regulate the relationship between fan and compressor rotational speeds is extremely important in designing the most efficient engine over a range of operating conditions. Such optimized engines have recently been referred to as variable cycle engines and are characterized as possessing variable geometry components in order to optimize performance for both subsonic and supersonic cruise, for example. It is characteristic of some of these variable cycle engines that both the high and low pressure turbines are of the variable area variety for maximum modulation of energy extraction.

Additionally, it is well understood that gas turbine engine shaft horsepower and specific fuel consumption, which is the rate of fuel consumption per unit of power output, can be improved by increasing turbine inlet temperatures to provide more energy for extraction. To permit turbines to operate at gas stream temperatures which are higher than the materials can normally tolerate, and to take advantage of the potential performance improvements associated with higher turbine inlet temperatures, considerable effort has been devoted to the development of sophisticated methods of turbine cooling. Modern cooling technology utilizes hollow turbine vanes and blades to permit operation at turbine inlet gas temperatures well in excess of 2300° F. (1260° C.). Various techniques have been devised to cool these hollow blades and vanes incorporating convection, impingement and film cooling, either singly or in combination. U.S. Pat. Nos. 3,700,348 and 3,715,170, assigned to the assignee of the present invention, are excellent examples of advanced turbine air cooling technology incorporating these basic cooling concepts.

However, air cooling has generally been limited in application to the high pressure turbine which is exposed to the highest combustion temperatures, and the delivery of cooling air to the high pressure turbine components has been relatively straightforward because of the proximity of these parts to the multistage compressor from which the relatively cool air is extracted as a source of coolant. But, in advanced high temperature turbofans and variable cycle engines, the low pressure turbine often requires the same considerations with regard to cooling as contemporary high pressure turbines. Unfortunately, these turbines do not enjoy the proximity to the coolant air source as the high pressure turbine. Furthermore, if the low pressure turbine is of the variable area variety in order to enhance energy modulation, the situation is compounded in that coolant air must be provided to the interior of movable vanes. Therefore, a structure is required which can not only support a stage of variable area vanes to provide efficient operation over a range of operating conditions, but which can also ensure that the vanes receive an adequate supply of cooling air in order to take advantage of the potential performance improvements associated with higher low pressure turbine inlet temperatures. It is also necessary that such a structure is of the lightest possible weight consistent with modern aircraft technology.

SUMMARY OF THE INVENTION

Accordingly, it is the primary object of the present invention to provide a manifold for the supply of cooling air to variable area turbine vanes, particularly, vanes of a low pressure turbine.

It is a further object of the present invention to provide such a manifold with structure capable of supporting a stage of variable area turbine vanes.

It is another object of the present invention to provide an inexpensive, lightweight structural cooling air manifold for variable area low pressure turbines.

It is yet another object of the present invention to provide, in combination, a stage of variable area turbine vanes and a structural manifold which distributes coolant air to each of the vanes and also provides structural support to the rotatable trunnions associated with each vane.

These and other objects and advantages will be more clearly understood from the following detailed description, drawings and specific examples, all of which are intended to be typical of rather than in any way limiting to the scope of the present invention.

Briefly stated, the above objectives are accomplished in an integrally cast, generally annular manifold having two thin concentric walls which surround a variable area, low pressure turbine. The thin walls define to their interiors a coolant plenum which is in fluid communication with a coolant source through a plurality of circumferentially spaced inlet ports associated with the outer wall. Each wall is provided with an equal number of aligned embossments through which generally radial, aligned holes are bored. Each vane has associated therewith an airfoil portion and an attached cylindrical trunnion which is inserted through a pair of aligned holes in the two walls. The holes and embossments journal each trunnion for rotation about its longitudinal axis and thereby provide structural support for the vane. Furthermore, since each trunnion passes through the plenum, coolant may be routed to the airfoil portion to perform cooling functions by means of passages which communicate with the plenum via openings in the hollow vane trunnions. Thus, the manifold performs the dual functions of distributing coolant to each of the vanes while also supporting the vane trunnions in a cantilevered fashion.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is a partial schematic view in cross section of a gas turbine engine of the turbofan variety incorporating the present invention;

FIG. 2 is an enlarged cross-sectional view of one embodiment of the structural cooling air manifold of the present invention associated with the low pressure turbine of the engine of FIG. 1;

FIG. 3 is a trimetric projection of a segment of the structural cooling air manifold of the present invention;

FIG. 4 is a view depicting in cross section the attachment of a turbine vane within the structural cooling air manifold of the present invention; and FIG. 5 is a view in partial section of the low pressure turbine section of the engine of FIG. 1 depicting the relationship between the variable area vanes and the structural cooling air manifold, and further illustrating the flow of coolant therethrough.

DESCRIPTION OF THE PREFERRED EMBODIMENT

Referring to the drawings wherein like numerals correspond to like elements throughout, attention is first directed to FIG. 1 wherein an engine depicted generally at 10 embodying the present invention is diagrammatically shown. This engine may be considered as comprising generally a core engine 12, a stage of fan blades 14, and a low pressure turbine 16 which is interconnected to the fan blades 14 by shaft 22. The core engine 12 includes a multistage axial flow compressor 24 having a rotor 26. Air enters inlet 28 and is initially compressed by the fan blades 14. A first portion of this compressed air enters the fan bypass duct 30 defined, in part, by core engine 12 and a circumscribing fan nacelle 32 and discharges through a fan nozzle 34. A second portion of the compressed air enters inlet 36, is further compressed by the axial flow compressor 24 and then is discharged to a combustor 38 where fuel is burned to provide high energy combustion gases which drive a high pressure turbine rotor 40. The turbine 40, in turn, drives compressor rotor 26 through a shaft 42 in the usual manner of a gas turbine engine. The hot gases of combustion then pass to and rotatably drive the low pressure turbine 16 which, in turn, drives the fan blades 14. A propulsive force is thus obtained by the action of the fan blades 14 discharging pressurized air from the fan bypass duct 30 through the fan nozzle 34 and by the discharge of combustion gases from a core engine nozzle 44 defined, in part, by plug 46. The above description is typical of many present-day gas turbine engines and is not meant to be limiting, as it will become readily apparent from the following description that the present invention is capable of application to any gas turbine engine power plant such as that used for marine and industrial applications. The foregoing description of the operation of the engine depicted in FIG. 1 is, therefore, merely illustrative of one type of engine to which the present invention is applicable.

Referring now to FIGS. 2 and 5, the low pressure turbine 16 is shown in greater detail and comprises a single row of variable area vanes 18 (only one of which is shown for clarity) disposed within a flow path 47 for the passage of hot combustion gases exiting the high pressure turbine 40 as shown by the arrows. The hot gases flow through the circumferentially spaced variable area vanes 18 to impinge upon a circumferentially spaced row of rotatable low pressure turbine blades or buckets 20 (again, only one of which is shown for clarity) which extract energy from the gases to rotatably drive fan blades 14 as depicted in FIG. 1. The gases then flow through a stationary row of circumferentially spaced nozzle vanes 48 which orient the flow for discharge through nozzle 44 (FIG. 1).

A typical vane 18 is shown to include an airfoil portion 50 of the fluid-cooled variety which is by now well understood in the art. The outer end of each vane is provided with a circular collar 52 which transists through a diameter step into a generally cylindrical trunnion 54. The inner surface 56 of the collar is contoured to partially define the flow path through the row of vanes 18 and the diameter step at 58 provides a bearing surface to limit radially outward movement of the vane as will soon become apparent. A cutout at 60 is provided merely to lighten the vane structure since weight is always a concern in aircraft gas turbine engines. Trunnion 54 has a hollow interior 62 closed at its outer end by a cap 64 which is recessed within the trunnion to form a generally cylindrical outer cavity 66. Cooling air enters the the hollow interior of the trunnion through communication means such as a pair of diametrically opposed round holes 68, and known passages are provided to route the coolant through the collar 52 to the hollow airfoil portion from which a portion is ejected through a plurality of trailing edge passages 70 as indicated by the arrows. The inner end of the vane is provided with a trunnion 72 of step diameter, having an enlarged diameter portion 74 and a reduced diameter portion 76 through which cooling air is directed by means of passage 78 for other cooling purposes. Support of the inner end of vane 18 is provided by an inner frame structure designated generally at 79 which journals trunnion 72 for rotation, but the details of which are beyond the scope of this invention.

Attention will now be directed toward the structure associated with the radially outer end of vane 18 by which the vane is cantilevered and through which cooling air is routed. Circumscribing the row of airfoils 50 and partially defining flow path 47 is an outer band 80 which is preferably made of a number of annular sectors forming a complete circle. These sectors are, in turn, supported by an annular outer band support 82 through a sliding tongue-and-groove connection at 84, the outer band support having at its forward end a radially outwardly extending flange 86 which is attached to a rigid annular high pressure turbine casing structure 88. Each outer band sector 80 is provided with at least one recessed cavity defined by cylindrical wall 90 which is truncated at its inner end to match the contour of inner surface 56 of collar 52. An annular flange 92 partially closes the base of each recessed cavity. Cylindrical wall 90 is of a diameter slightly larger than the cylindrical collar 52 which it receives and which seats against the annular flange 92 at diameter step 58 to establish the radial position of vane 18.

An elliptical sealing ring 94 fits snugly into a machined groove in the collar 52. When viewed along the axis of rotation of the vane, the sealing ring appears to be circular but in profile follows generally the contour of collar surface 56. Had a circular sealing ring been used in this application, cavity 96 between cylindrical wall 90 and collar 52 would have been very deep due to the highly sloped flow path and unpredictable flow distortions could have resulted. Sealing ring 94 primarily serves the function of discouraging flow leakage from flow path 47 and around collar 52.

Surrounding the ring of outer band segments 80 is an annular structural bleed manifold 98 which is depicted in greater particularity in FIG. 3 to which attention is now additionally directed. It can be appreciated that a rigid frame structure is required to provide cantilever support of vanes 18 and to react the high gas loadings upon the airfoils 52. It can additionally be appreciated that a structure is necessary to route cooling air to the vanes in order to permit the vanes to withstand the effects of the combusted gases within flow path 47. In accordance with the objectives of the present invention, structural bleed manifold 98 performs these dual functions.

Two basic considerations govern the design of the bleed manifold. First, it must provide a large plenum for supplying cooling air to the variable vane trunnions. Secondly, the complex features must be arranged so as to minimize cost and weight. Accordingly, manifold 98 comprises a generally annular casting having two thinly cast walls 100 and 102 which define an annular cooling air plenum 104 therebetween having three axially spaced plenum chambers 114, 115 and 116. Inner wall 100 is generally frustoconical whereas outer wall 102 is generally arcuate in the axial direction, diverging from the inner wall and then converging therewith to form the plenum therebetween. Associated with outer wall 102 is a plurality of circumferentially spaced cylindrical inlet ports 106 which project axially forwardly and which are of generally circular cross section when viewed from the front in the axial direction. Fluidly communicating with inlet ports 106 is a plurality of bleed conduits 108 (FIG. 1) which carry bleed air from the intermediate stages of the axial compressor 24 as a source of coolant. Thus, inlet ports 106 provide a means for routing cooling air into the plenum wherein it is dispersed circumferentially.

Within plenum 104 is a pair of internal stiffening rings 110, 112 which extend between the inner and outer walls 100, 102, respectively, to provide backbone strength to the manifold. As a result, forward chamber 114 and aft chamber 116 are partially separated from the interior chamber 115 by ribs 110, 112, respectively. However, fluid communication with the forward chamber is provided through a plurality of circumferentially spaced holes 118 in rib 110 which are in general alignment with inlet ports 106 such that a portion of the cooling air entering the inlet port is dispersed within forward chamber 114 and the remainder passes through ribs 110 into the intermediate chamber 115. Chamber 116 is in fluid communication with the interior chamber 115 by means of a row of circumferentially spaced holes 120 through ribs 112 to provide means for aiding the circumferential distribution of coolant.

The manifold is additionally provided with a plurality of circumferentially spaced, outwardly projecting cast embossments 122 of generally circular profile associated with outer wall 100 and a similar number of inwardly projecting circular embossments 124 associated with inner wall 102. Embossments 122 and 124 are circumferentially and axially aligned and finish-machined to produce pairs of aligned radial holes 126, 128 defined by machined bearing surfaces 130, 132, respectively, which are sized to journal trunnion 54 for rotation therein. Initially, embossments 122, 124 and holes 126, 128 are rough cast to facilitate core removal. The holes are then machine-bored to accept the variable vane trunnions.

A generally L-shaped extension 136 having a circular flange 138 is butt-welded to the forward end of the manifold casting at 140, and the flange is secured to the rigid high pressure turbine casing structure by a circle of bolts 142 to simultaneously capture flange 86 of the outer band support as illustrated in FIG. 2. Another L-shaped extension 144 having a much longer cylindrical section 146 and terminating in a circular flange 148 is butt-welded to the aft end of the manifold casting at 150 and this flange is secured to downstream rigid casing structure 151 as shown in FIG. 2. Thus, the manifold provides a portion of the structural backbone of core engine 12.

Vane trunnion 54 is inserted within a pair of aligned holes 126, 128 of embossments 122, 124, respectively, to seat collar 52 against flange 92 at the diameter step 58, and flange 92, in turn, is in abutting engagement with a flat portion 152 machined on embossment 124 to restrict radially outward movement. A vane lever 154 is provided with a dished portion 156 which fits snugly within trunnion cavities 66 and a circular flange 158 which overhangs the outer end of trunnion 54 and embossment 122 which are machined flat. The vane lever is secured to the trunnion by means of a bolt 160 and nut 162 which clamp the dished portion 156 of the vane lever and the trunnion cap 64 together through cooperating bolt holes. The bolt is inserted through coolant hole 68 and a D-shaped head 164, the flat portion of which abuts stop 166 projecting inwardly from cap 64, prevents the bolt from turning as the nut is torqued. Thus, the manifold is captured between flange 158 and diameter step 58 in combination with flange 92 to positively locate the vane with respect to the rigid engine structure. A lever arm 168 attached to a known variety of actuator imparts rotation to the vanes which are journaled by bearing surfaces 130 and 132. The radial distance between embossments 122 and 124 should be such that when vane lever 154 is securely bolted to the end of vane trunnion 54, the outer band sector flange 92 and the manifold are not so tightly sandwiched between diameter step 58 and vane lever flange 158 as to prevent rotation of the vane trunnion 54.

During typical operation of the aircraft engine, relatively cool air is routed via conduits 108 into manifold 98 through inlet ports 106 whereupon it is distributed throughout plenum chambers 114, 115 and 116. A portion of this cooling air enters the vane trunnions from plenum chamber 115 through holes 68 to perform cooling of the airfoil portion 50 in a manner previously described. Another portion passes through holes 120 within rib 112 into chamber 116 which aids in the circumferential distribution of coolant for the vanes since it is apparent from FIG. 5 that the clearance between vane trunnion 54 and ribs 110, 112 is quite tight. However, the coolant air in chamber 116 is used for another purpose as is best shown in FIG. 2.

Turbine efficiency and, in particular, turbine rotor blade efficiency, is closely related to blade clearance. In order to enhance turbine efficiency, an annular shroud 170 circumscribes the row of turbine buckets 20 in close clearance relationship therewith, the shroud being of step radius and provided with a suitable abradable material 172 such as open cellular honeycomb on the steps. Each bucket is provided with a radially projecting tip shroud 174 which partially defines the flow path through the bucket. On the back side of each shroud is a series of labyrinth seals 176 (here two in number) which frictionally engage the abradable material 172 at particular operational moments wherein the clearance between the seals and shroud 170 may be temporarily lost. The shroud 170 is annular and is attached to the structural cooling air manifold flange 148 by a circle of bolts 178. A long support arm 180 is used to isolate the shroud from the irregular and unpredictable growth of the manifold flange 148. Since the free end of the shroud is free to grow radially, it can be moved out of the way of the rotating tip shroud during rapid engine transient operation. A series of circumferentially spaced holes 182 through inner wall 102 permits cooling air from chamber 116 to impinge upon shroud 180 to cause it to expand and contract in diameter to maintain close clearances during steady-state operation. This is a result of the fact that the coolant air will be at a relatively higher temperature during high speed operation, causing shroud 170 to grow in diameter while the turbine buckets 20 are also experiencing radial growth, and vice versa.

Cooling air from chamber 114 is permitted to flow radially inwardly through a series of circumferentially spaced holes 184 cast within inner wall 102 in order to provide fluid cooling of the outer band sectors 80 by the impingement principle utilizing a series of showerhead-type impingers 186 (FIG. 5) which are fitted between the vane trunnions behind the outer band sectors 80. This concept is described in more particularity in copending U.S. patent application Ser. No. 898,061, Landis et al entitled "Turbine Band Cooling System," which is assigned to the assignee of the present invention and the subject matter of which is incorporated herein by reference.

It should be obvious to one skilled in the art that certain changes can be made to the above-described invention without departing from the broad inventive concepts of a structural cooling air manifold which provides cantilever support for a stage of variable area turbine vanes in the manner of a traditional turbine frame as well as providing a means for routing cooling air to the vanes for cooling purposes. For example, while the present invention has been shown in the context of a low pressure turbine, the principle is equally applicable to high pressure turbines. Furthermore, the structural configuration of the casting may be modified slightly while still remaining within the basic concept of providing both structural support and cooling fluid to a stage of rotatable vanes. The present invention is believed to be the only viable approach to supplying air to a high temperature, variable area low pressure turbine and it is estimated that in one application the present invention saves approximately $15,000 in cost as compared to a completely machined part.

It is intended that the appended claims cover the aforementioned and all other variations in the present invention's broader inventive concepts.

Having thus described the invention, what is claimed as novel and desired to be secured by Letters Patent of the United States is:

1. In a gas turbine engine, a structural cooling air manifold easily cast as a generally annular, integral unit having an internal, generally annular plenum formed between two concentric walls, an outer embossment formed upon the outer of said walls, an inner embossment formed upon the inner of said walls, a plurality of circumferentially spaced inlet ports associated with said outer wall for routing cooling air into said plenum, and wherein said embossments include generally aligned holes therethrough circumferentially interspaced between said inlet ports for the receipt and structural support of a variable position vane trunnion, thereby providing unencumbered radial access to said vane trunnion for control thereof.

2. The invention as recited in claim 1 wherein said inlet ports comprise a plurality of circumferentially spaced, generally cylindrical inlet ports which project axially from said outer wall and which fluidly communicate with said plenum.

3. The invention as recited in claim 1 further comprising a pair of axially spaced circumferential stiffening rings within said plenum which extend between said outer and inner walls to partially define forward and aft annular plenum chambers.

4. The invention as recited in claim 3 wherein said pair of rings each include a plurality of circumferentially spaced holes for routing cooling air into said forward and aft plenum chambers to enhance circumferential distribution of cooling air.

5. In a gas turbine engine, a combination of a structural cooling air manifold that is easily cast as a generally annular, integral unit having an internal, generally annular plenum formed between two concentric walls, an outer embossment formed upon the outer of said walls, an inner embossment formed upon the inner of said walls, a plurality of circumferentially spaced inlet ports associated with said outer wall for routing cooling air into said plenum, generally aligned holes through said inner and outer embossments circumferentially interspaced between said inlet ports, and an air-cooled vane comprising an airfoil portion connected to a generally cylindrical trunnion having a hollow interior, and wherein said vane trunnion is received within said aligned holes and supported by said embossments thereby providing unencumbered radial access to said vane trunnion.

6. The invention as recited in claim 5 further comprising a circumferential stiffening ring within said plenum extending between said outer and inner walls to partially define a forward annular plenum chamber to which cooling air is routed through a plurality of circumferentially spaced holes in said stiffening ring and wherein said inlet ports comprise a plurality of circumferentially spaced, generally cylindrical inlet ports which project axially from said outer wall and which fluidly communicate with said plenum and said forward annular chamber.

7. The invention as recited in claim 5 wherein said vane trunnion is journaled for rotation within said embossments.

8. The invention as recited in claim 5 wherein said vane includes means for providing fluid communication between said plenum and the hollow interior of said trunnion.

9. In combination, an air-cooled vane comprising an airfoil portion connected to a generally cylindrical trunnion, a manifold easily cast as a generally annular, integral unit having a generally annular internal plenum formed between two concentric walls through which said trunnion passes, means for supporting said trunnion from said walls, axial means for routing cooling air into said plenum and means for routing cooling air from said plenum into said airfoil.

10. In a gas turbine engine, a structural cooling air manifold easily cast as a generally annular, integral unit having two generally concentric walls defining a plenum therebetween, means for axially routing a fluid into said plenum, and wherein said walls are each provided with aligned embossments having aligned holes therethrough for the structural support of a rotatable vane trunnion thereby providing unencumbered radial access to said structural support.

11. A gas turbine engine comprising a fan for pressurizing a quantity of air; a compressor for further pressurizing air from said fan; a high pressure turbine drivingly connected to said compressor, a low pressure turbine drivingly connected to said fan, said low pressure turbine including a row of variable angle stator vanes each having a hollow airfoil portion connected to a trunnion; a cooling air manifold generally surrounding said low pressure turbine and easily cast as a generally annular, integral unit having an internal, generally annular plenum formed between two concentric walls, means for supporting said vane trunnions with both of said walls thereby providing unencumbered radial access to said vane trunnions for control of said stator vanes; means for routing air from said compressor to said manifold plenum, and means for routing air from said plenum and into said airfoils.

* * * * *